United States Patent
Toolan et al.

(10) Patent No.: US 11,752,051 B2
(45) Date of Patent: Sep. 12, 2023

(54) VEHICLE LIFT FOR MOBILITY DEVICE

(71) Applicant: Harmar Mobility, LLC, Sarasota, FL (US)

(72) Inventors: Daniel Patrick Toolan, North Port, FL (US); Derek James Nash, Bradenton, FL (US); David Russel Baxter, Sarasota, FL (US)

(73) Assignee: Harmar Mobility, LLC, Sarasota, FL (US)

( * ) Notice: Subject to any disclaimer, the term of this patent is extended or adjusted under 35 U.S.C. 154(b) by 8 days.

(21) Appl. No.: 17/076,417

(22) Filed: Oct. 21, 2020

(65) Prior Publication Data

US 2022/0117805 A1   Apr. 21, 2022

(51) Int. Cl.
| | | |
|---|---|---|
| *A61G 3/02* | (2006.01) | |
| *B60R 9/06* | (2006.01) | |
| *B60P 1/44* | (2006.01) | |
| *B60P 3/07* | (2006.01) | |

(52) U.S. Cl.
CPC .......... *A61G 3/0209* (2013.01); *B60P 1/4421* (2013.01); *B60P 3/07* (2013.01); *B60R 9/06* (2013.01)

(58) Field of Classification Search
CPC ..... B60P 1/4442; B60P 1/4421; B60P 1/4428; A61G 3/0209; A61G 3/062
See application file for complete search history.

(56) References Cited

U.S. PATENT DOCUMENTS

| 4,664,584 | A  | * | 5/1987 | Braun | A61G 3/062 187/217 |
|---|---|---|---|---|---|
| 6,726,435 | B1 | * | 4/2004 | Williams | B60P 1/4442 414/560 |
| 7,284,944 | B1 | * | 10/2007 | Schlangen | A61G 3/062 414/921 |
| 7,396,202 | B1 | * | 7/2008 | Panzarella | A61G 3/062 414/641 |
| 7,845,703 | B2 | * | 12/2010 | Panzarella | B60N 2/163 296/65.11 |
| 8,235,644 | B2 | * | 8/2012 | DiGiovanni | A61G 3/06 414/921 |
| 8,403,605 | B2 |   | 3/2013 | Glasser et al. | |

(Continued)

OTHER PUBLICATIONS

80/20 Catalog Excerpt from https://8020.net/bookshelf. (Year: 2019).*

(Continued)

*Primary Examiner* — Mark C Hageman
(74) *Attorney, Agent, or Firm* — Banner & Witcoff, Ltd.

(57) ABSTRACT

A vehicle lift includes a lift base, a movable lift tower, and a movable platform. A first rail is configured to move the lift tower horizontally, and includes a outer extruded rails secured to the lift base, central extruded rails movable with respect to the outer extruded rails, and inner extruded rails movable with respect to the central extruded rails and fixed to the lift tower. A second rail assembly is fixed to the lift tower and may move the platform vertically with respect to the lift tower, and includes a outer extruded rails secured to the lift tower, central extruded rails movable with respect to the outer extruded rails, and inner extruded rails movable with respect to the central extruded rails and fixed to the lift tower.

21 Claims, 15 Drawing Sheets

(56) References Cited

U.S. PATENT DOCUMENTS

| | | | | |
|---|---|---|---|---|
| 8,403,615 | B1* | 3/2013 | McGlinn | B60P 1/4457 |
| | | | | 414/549 |
| 8,956,102 | B2* | 2/2015 | Alasfour | A61G 3/0808 |
| | | | | 410/67 |
| 8,998,558 | B2* | 4/2015 | Kitchin | A61G 3/06 |
| | | | | 414/544 |
| 2005/0105995 | A1* | 5/2005 | Freet | B60P 1/4442 |
| | | | | 414/541 |
| 2010/0054900 | A1* | 3/2010 | Houtveen | B60P 1/4428 |
| | | | | 254/95 |
| 2010/0215468 | A1* | 8/2010 | Kollewe | B60P 1/4442 |
| | | | | 414/544 |

OTHER PUBLICATIONS

80/20 Video from youtube, https://www.youtube.com/watch?v=dwXBYn3KmqA&list=PLrgoDzr3Jjl226ubjBJ54oFiU4I05XCuH&index=3 (screen shot provided in PDF form) (Year: 2019).*

* cited by examiner

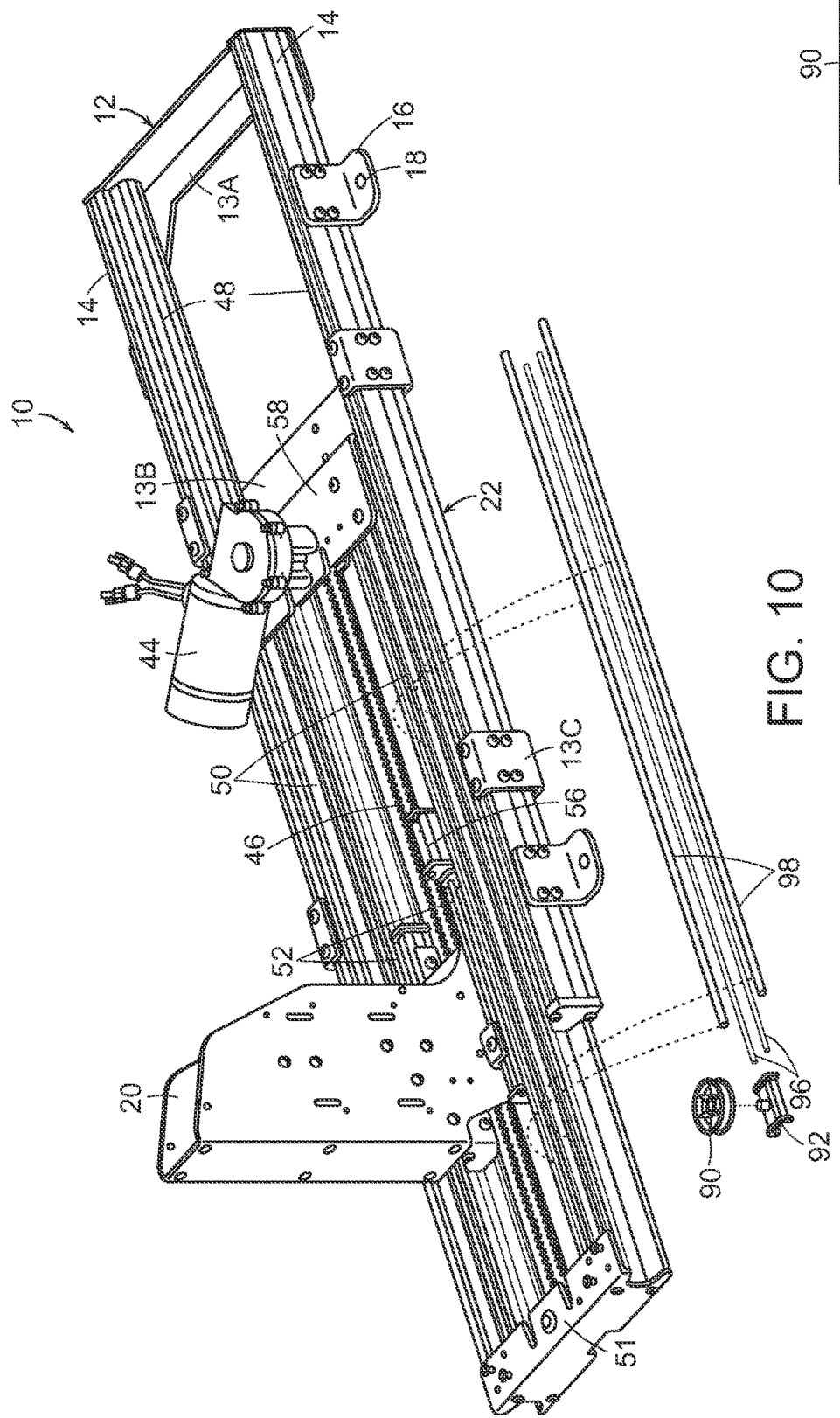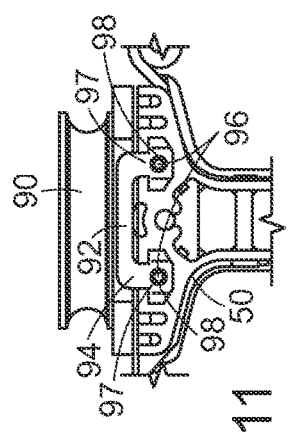
FIG. 10
FIG. 11

VEHICLE LIFT FOR MOBILITY DEVICE

FIELD

Aspects of this invention relate generally to a vehicle lift for a mobility device, and, in particular, to a vehicle lift formed of a plurality of extruded rails and including a hold down arm.

BACKGROUND

Various types of vehicle lifts are available to load power chairs, scooters, wheelchairs, or other mobility devices into a cargo area of a user's vehicle. Hybrid vehicle lifts may be mounted within the cargo area of the vehicle and move a platform horizontally out of the vehicle and then down to the ground where the mobility device can be loaded onto the platform. The platform may then be moved upwardly and then horizontally into the cargo area of the vehicle for storage therein.

Many vehicle lift systems use dual linear slide systems that use rollers and steel channels to shuttle, raise and lower the platform in and out of the cargo area of the vehicle. Some of the components of the lift systems may need to be welded, which may extend manufacturing time and increase costs. Rollers inside of I-beam or C channels have a line contact and require substantial steel channels to prevent permanent deformation when a static load test of 3× the rated load is performed. Steel channel/roller systems tend to be tall, which may reduce the amount of space for mobility devices within the cargo area of the vehicle, the size of which is fixed. Steel channel/roller systems also tend to require lubrication that can escape desired areas when heat reaches extremes inside vehicles.

Many lift systems use two, three, or four hold down straps (either ratcheting or non-ratcheting) to secure the device within the cargo area of the vehicle to prevent it from moving around while driving. This can be done when the unit platform is in either the down or out position with respect to the cargo areas, but in either case the user must bend/extend over to secure hooks from straps. This can be a challenge for some mobility challenged users.

Although most vehicles have illumination of the rear door/hatch when doors are open at night, such illumination is often inadequate, and sometimes the vehicle lift can obscure the illumination where it is needed around the mobility device.

It would be desirable to provide a vehicle lift for a mobility device that reduces or overcomes some or all of the difficulties inherent in prior known lift assemblies. Particular objects and advantages will be apparent to those skilled in the art, that is, those who are knowledgeable or experienced in this field of technology, in view of the following disclosure of the invention and detailed description of certain embodiments.

SUMMARY

Aspects of the present invention may be used to advantageously provide a vehicle lift that is lightweight but strong, and is configured to secure a mobility device to a platform of the vehicle lift, and provides illumination for the user for operation of the vehicle lift in the dark.

In accordance with a first aspect, a vehicle lift includes a lift base configured to be mounted in a cargo area of a vehicle. A lift tower is movable with respect to the lift base, and a platform is movable with respect to the lift tower. A first rail assembly is fixed to the lift base and the lift tower and is configured to move the lift tower horizontally with respect to the lift base. The first rail assembly includes a first pair of outer extruded rails secured to the lift base, a first pair of central extruded rails movable with respect to the first pair of outer extruded rails, and a first pair of inner extruded rails movable with respect to the first pair of central extruded rails and fixed to the lift tower. A second rail assembly is fixed to the lift tower and the platform and is configured to move the platform vertically with respect to the lift tower. The second rail assembly includes a second pair of outer extruded rails secured to the lift tower, a second pair of central extruded rails movable with respect to the second pair of outer extruded rails, and a second pair of inner extruded rails movable with respect to the second pair of central extruded rails and fixed to the lift tower.

In accordance with another aspect, a vehicle lift includes a lift base configured to be mounted in a cargo area of a vehicle. A lift tower is movable with respect to the lift base, and a pair of LED lights is mounted proximate a top of the lift tower. A platform is movable with respect to the lift tower. A first rail assembly is fixed to the lift base and the lift tower and is configured to move the lift tower horizontally with respect to the lift base. The first rail assembly includes a first outer pair of extruded rails secured to the lift base, a first central pair of extruded rails movable with respect to the first outer pair of extruded rails, and a first inner pair of extruded rails movable with respect to the first central pair of extruded rails and fixed to the lift tower. A second rail assembly is fixed to the lift tower and the platform and is configured to move the platform vertically with respect to the lift tower. The second rail assembly includes a second outer pair of extruded rails secured to the lift tower, a second central pair of extruded rails movable with respect to the second outer pair of extruded rails, and an inner pair of extruded rails movable with respect to the second central pair of extruded rails and fixed to the lift tower. A handheld control is operable to control operation of the first rail assembly and the second rail assembly, and includes a pair of LED lights at a distal end thereof.

From the foregoing disclosure, it will be readily apparent to those skilled in the art, that is, those who are knowledgeable or experienced in this area of technology, that preferred embodiments of a vehicle lift for a mobility device may provide a significant technological advance in terms of improved manufacturability, reduction in cost, and ease of use. These and additional features and advantages will be further understood from the following detailed disclosure of certain preferred embodiments.

BRIEF DESCRIPTION OF THE DRAWINGS

FIG. 10 is an exploded view of a portion of a lift tower and first rail assembly of the vehicle lift of FIG. 1.

FIG. 11 is an elevation view of a spool and rail of a first rail assembly of the vehicle lift of FIG. 1.

Figure 1:
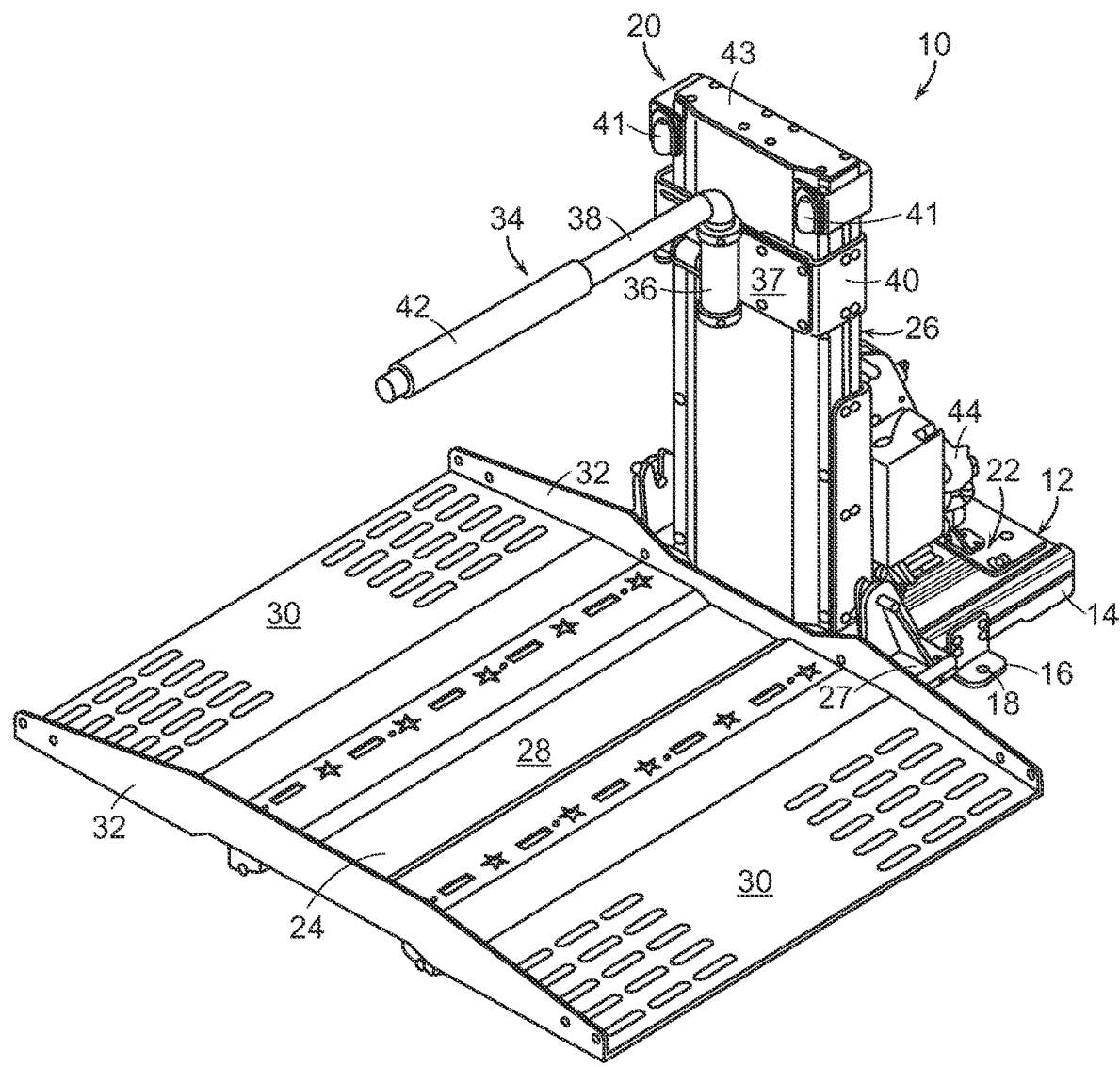
FIG. 1 is a front perspective view of a vehicle lift in a stored condition.

The figures referred to above are not drawn necessarily to scale and should be understood to provide a representation of the invention, illustrative of the principles involved. Some features of the vehicle lift for a mobility device depicted in the drawings have been enlarged or distorted relative to others to facilitate explanation and understanding. The same reference numbers are used in the drawings for similar or identical components and features shown in various alternative embodiments. Vehicle lifts for mobility devices as disclosed herein would have configurations and components determined, in part, by the intended application and environment in which they are used.

DETAILED DESCRIPTION OF CERTAIN PREFERRED EMBODIMENTS

The present invention may be embodied in various forms. An embodiment of a vehicle lift 10 is shown in FIG. 1. For convenience, the terms "upper" and "lower", "top" and "bottom" are used herein to differentiate between the upper and lower ends of vehicle lift 10 and particular components of the lift. It is to be appreciated that "upper" and "lower", "top" and "bottom", and other directional terms are used only for ease of description and understanding and that they are not intended to limit the possible spatial orientations of the vehicle lift or its components during assembly or use.

The term "substantially", as used herein, is meant to mean mostly, or almost the same as, within the constraints of sensible commercial engineering objectives, costs, manufacturing tolerances, and capabilities in the field of vehicle lift manufacturing and use. Similarly, the term "approximately" as used herein is meant to mean close to, or about a particular value, within the constraints of sensible commercial engineering objectives, costs, manufacturing tolerances, and capabilities in the field of vehicle lift manufacturing and use.

In the illustrated embodiment, vehicle lift 10 includes a lift base 12 configured to be mounted in a cargo area of a vehicle, e.g., a minivan or Sport Utility Vehicle (not shown). Lift base 12 may include a pair of opposed side rails 14, that may be mounted by way of brackets 16 to a floor of the cargo area of the vehicle. An aperture 18 may be provided in each bracket 16, through which a fastener (not shown) such as a bolt, for example, may extend for connection to the floor of the cargo area of the vehicle.

Figure 2:
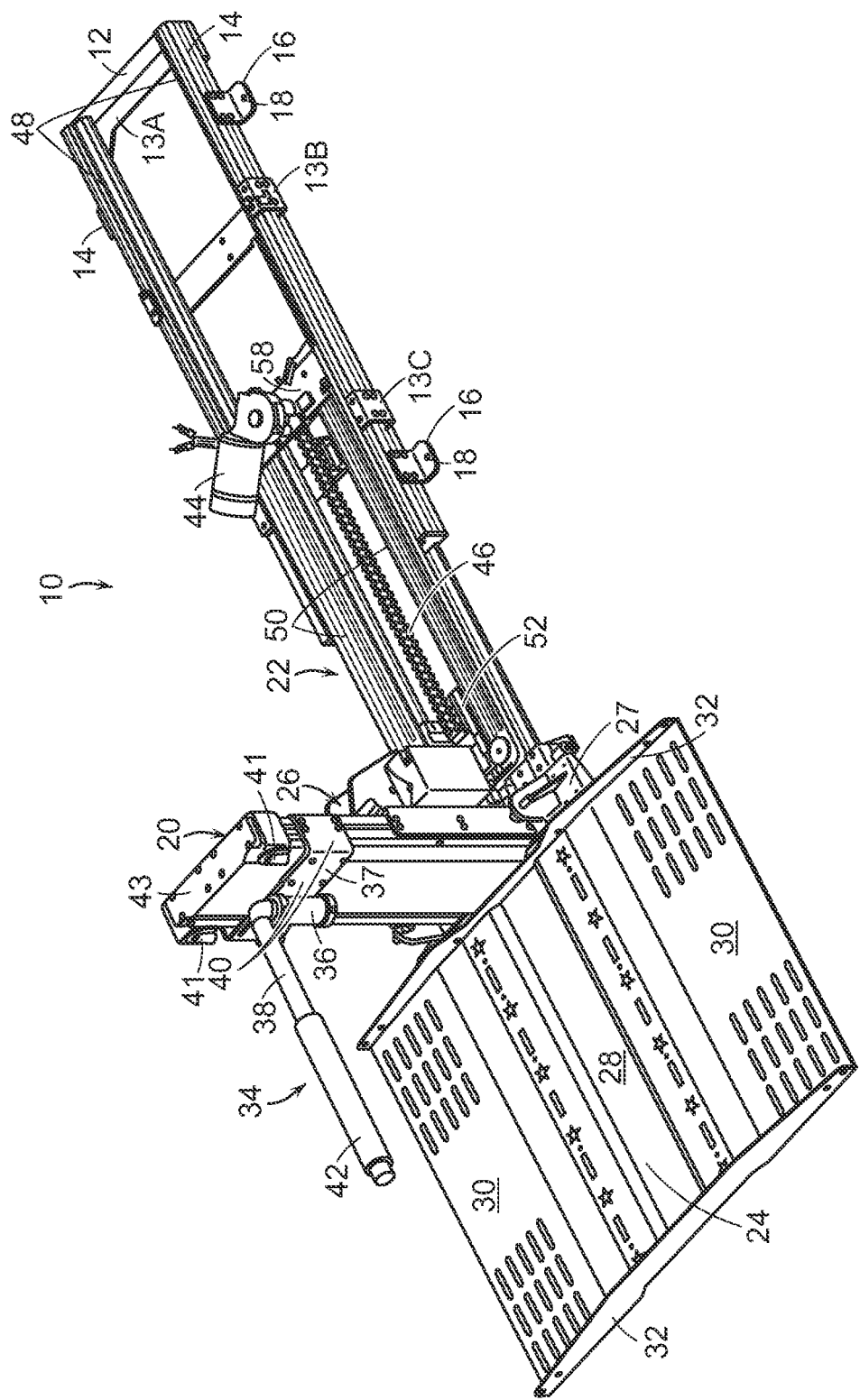
FIG. 2 is a front perspective view of the vehicle lift of FIG. 1 in a partially extended condition.

A lift tower 20 may be movably connected to lift base 12 by way of a first rail assembly 22, which operates to move lift tower 20 horizontally with respect to lift base 12 and the cargo area of the vehicle, such that lift tower 20 is positioned outboard of the cargo area of the vehicle, as seen in FIG. 2 and described in greater detail below.

A platform 24 may be movably connected to lift tower 20 by way of a second rail assembly 26, seen in FIG. 3 and described in greater detail below, which operates to move platform 24 vertically with respect to lift tower 20 once lift tower 20 is positioned outboard of the cargo area of the vehicle. Platform 24 may be secured to a pair of arms 27 that extend outwardly from lift tower 20 under platform 24, seen in greater detail in FIG.

Platform 24 may have a central portion 28 on which a mobility device, such as a motorized scooter or wheelchair, for example, may be positioned for storage in the cargo area of the vehicle. Central portion 28 may be recessed to accommodate the wheels of the mobility device, which may help the mobility device fit within the cargo headroom of the vehicle. Recessed central portion 28 may be especially advantageous for powered wheel chairs with large center wheels.

Ramps 30 may be formed on opposite sides of central portion 28 to allow the mobility device to be wheeled into position on platform 24. Sidewalls 32 may be formed along and extend upwardly from opposed sides of platform 24, and may act as bumpers to help retain the mobility device on platform 24.

A hold down arm 34 may be pivotally secured to lift tower 20, and may serve to help retain the mobility device on platform 24. It is to be appreciated that in certain embodiments hold down arm 34 could be fixed with respect to lift tower 20 rather than be pivotally secured thereto.

Hold down arm 34 may have a vertically extending first portion (not visible) pivotally received in a pivot bracket 36 that is mounted to a support plate 37, which is secured to lift tower 20 by way of a support bracket 40. Support plate 37 may be secured to support bracket 40 by way of a plurality of fasteners, such as bolts, for example. A second portion 38 of hold down arm 34 may extend horizontally outwardly from an upper end of the first portion. In use, when the mobility device is being rolled onto, or mounted on platform 24, hold down arm 34 may be pivoted about pivot bracket 36 such that second portion 38 is swung out of the way. Once the mobility device is properly positioned on platform 24, second portion 38 may be pivoted outwardly until it is positioned above the mobility device, thereby sandwiching or capturing the mobility device between second portion 38 of hold down arm 34 and platform 24, thereby helping secure the mobility device on platform 24 without the use of any external straps. In certain embodiments, support plate 37 may be secured to lift tower 20 in an inverted position such that second portion 38 of hold down arm 34 extends horizontally outwardly from a lower end of the first portion of hold down arm 34.

Hold down arm 34 may be movably secured to lift tower 20 by way of support plate 37 and support bracket 40. Support bracket 40 may be secured to lift tower 20 at different heights such that the vertical position of hold down arm 34 corresponds to the particular mobility device to be loaded on platform 24. Additionally, support plate 37 can be moved horizontally with respect to support bracket 40 such that the horizontal position of hold down arm 34 can correspond to the particular corresponds to the particular mobility device to be loaded on platform 24.

A sleeve 42 may be positioned on second arm 38. Sleeve 42 may be formed of a compressible, resilient material, such as ethylene propylene diene monomer ("EPDM"), neoprene, or polyethylene foam. The resilience of sleeve 42 in conjunction with the resilience of the seat of the mobility device, for example, may help create a positive retaining force on the mobility device.

One or more lights 41 may be secured to lift tower 20, and may serve illuminate platform 24 to help the user when loading or unloading the mobility device onto or off of platform 24 when it is dark. In the illustrated embodiment, two downwardly projecting lights 41 are mounted proximate an upper surface 43 of lift tower 20, with lights 41 angled downwardly and outwardly to illuminate all of platform 24. Lights 41 may be configured to automatically turn on as lift tower 20 begins to move outwardly horizontally from its stored condition in the cargo area of the vehicle, and to turn off when lift tower 20 returns to its stored condition.

It is to be appreciated that more than two lights 41 can be provided on lift tower 20 to increase visibility for the user in dark conditions when working vehicle lift 10, and such lights could be positioned at any locations along lift tower 20. It is also to be appreciated that additional lights 41 could be provided on platform 24 to increase visibility when loading the mobility device on platform 24.

In certain embodiments, lights 41 may be LED lights. Other suitable light types for lights 41 will become readily apparent to those skilled in the art, given the benefit of this disclosure.

Figure 3:
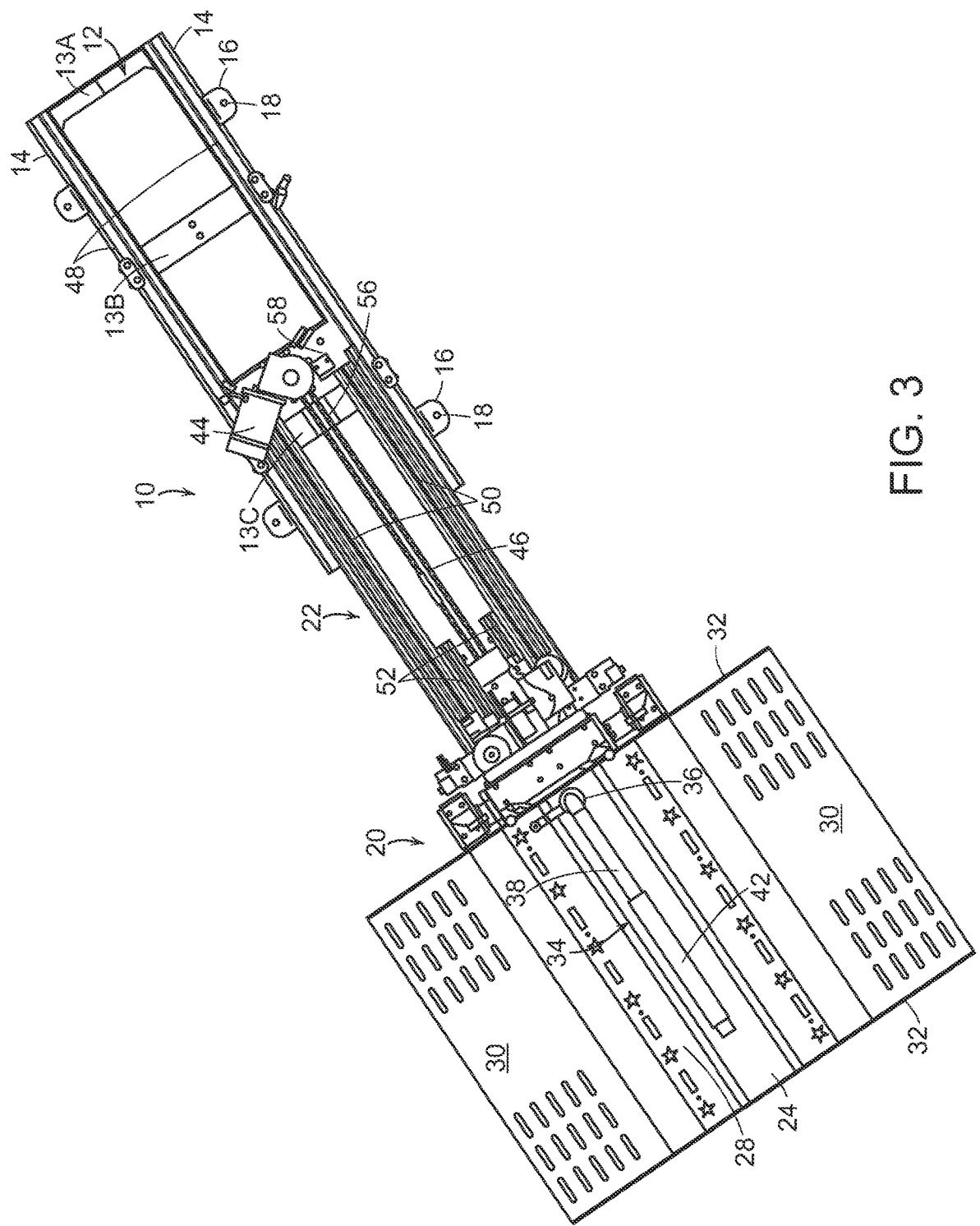
FIG. 3 is a top plan view of the vehicle lift of FIG. 1 in a partially extended condition.
Figure 4:
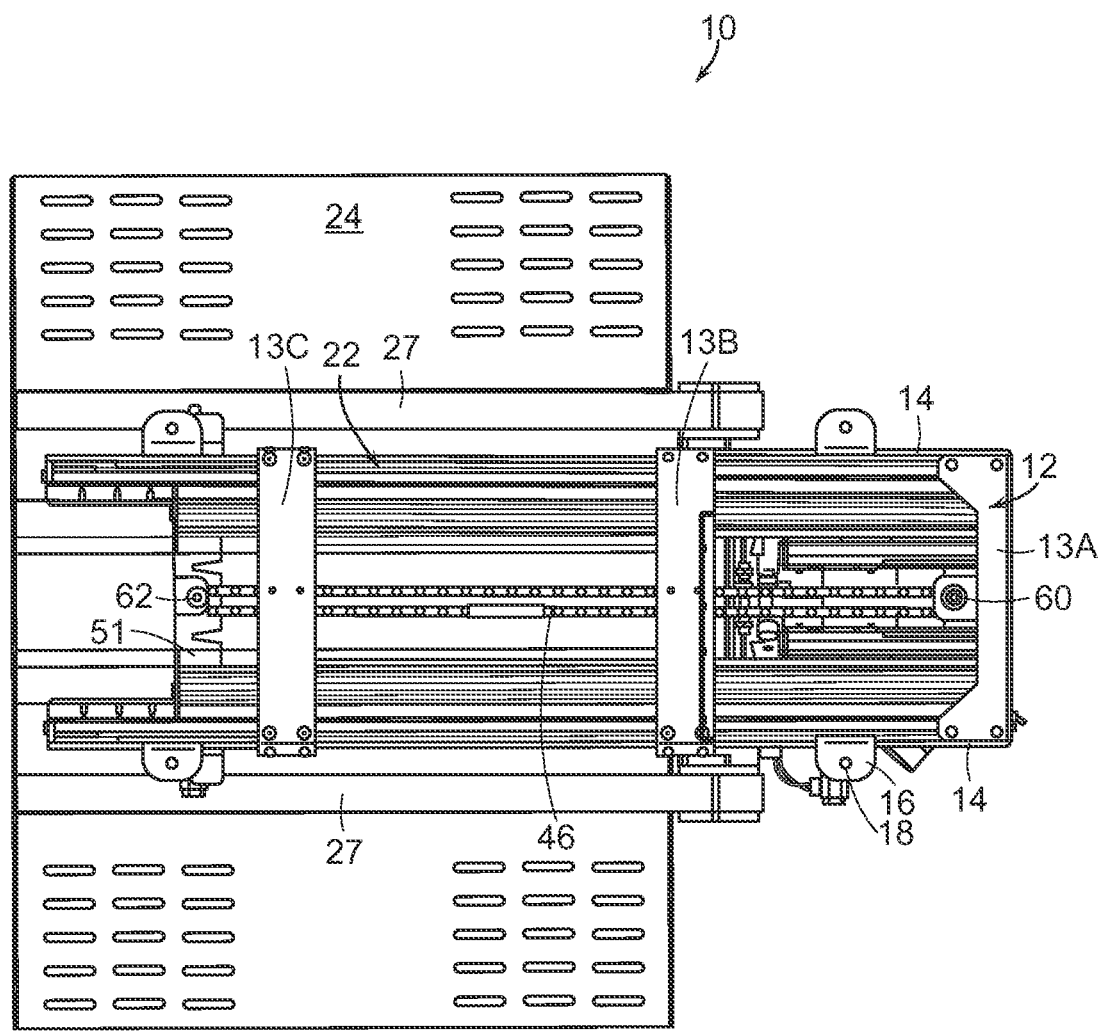
FIG. 4 is a bottom plan view of the vehicle lift of FIG. 1 in its stored condition.

As noted above first rail assembly 22 operates to move lift tower 20 horizontally, as seen in FIGS. 2-4. FIGS. 2 and 3 are top views of first rail assembly 22 in its fully extended position, while FIG. 4 shows first rail assembly in its fully contracted position. As seen in FIG. 4, arms 27 extend beneath and provide support for platform 24. Arms 27 may be pivotably connected to lift tower 20 such that platform 24 can conform to a slope of the ground upon which the vehicle is positioned.

First rail assembly 22 may include at least two pairs of extruded rails that cooperate with a first motor 44 that drives a chain 46 to move lift tower 20 horizontally. In the illustrated embodiment, first rail assembly 22 includes three pairs of extruded rails. First rail assembly 22 may include a first pair of outer extruded rails 48, each of which is secured to a side rail 14 of lift base 12. As seen in FIG. 4, lift base 12 may include a first cross rail 13A, a second cross rail 13B, and a third cross rail 13C. A first pair of central extruded rails 50 is positioned inwardly and adjacent to the first pair of outer extruded rails 48 such that each central extruded rail 50 slides horizontally along a corresponding outer extruded rail 48 as tower lift 20 moves horizontally. Central extruded rails 50 may be secured together at a set distance from one another by a cross member 51, seen in FIG. 10, and a motor mount 58, seen in FIGS. 2-3. A first pair of inner extruded rails 52 is positioned inwardly and adjacent to the first central pair of extruded rails 50 such that each inner extruded rail 52 slides horizontally along a corresponding central extruded rail 50 as tower lift 20 moves horizontally. A tower lift base mount 54 may be secured to first pair of inner extruded rails 52 such that first pair of inner extruded rails 52 are spaced apart from one another an appropriate distance, and inner extruded rails 52 and tower 20 move together horizontally.

Chain 46 may be secured to lift base 12 at a fixing point 56 on third cross rail 13C. First motor 44 may be secured to a motor mount 58 that is secured to a rear end of first pair of central extruded rails 50 such that first motor 44 and first pair of central extruded rails 50 move together horizontally. Chain 46 may also be secured to tower lift 20 such that tower lift 20 and inner rails 52 move horizontally within central rails 50. The horizontal motion is compound, that is, tower lift 20 and inner rails 52, as well as central rails 50 move simultaneously.

In operation, first motor 44 may rotate a first drive gear 60, seen in FIG. 4, that meshes with chain 46. Chain 46 may also mesh with a driven second gear 62, which is mounted to cross member 51. A first side of chain 46 may be anchored to lift base 12 at fixing point 56, and the rotational movement of first drive gear 60 causes first motor 44, motor mount 58, and first pair of central extruded rails 50 to move horizontally along chain 46 and along first pair of outer extruded rails 48. A second side of chain 46 may be a chain connector 54, which in turn may be connected to lift tower 20 and, therefore, first pair of inner extruded rails 52 may move with the second side of chain 46.

When first motor 44 is operating, chain 46 is anchored to lift base 12 at fixing point 56, and chain 46 moves with drive gear 60, driven gear 62, and cross member 51 to move central rails 50, inner rails 52, and lift tower 12 horizontally. Thus, lift tower 12 and platform 24 are moved horizontally outwardly from the cargo area when the mobility device is being unloaded, and horizontally inwardly toward the cargo area when the mobility device is being loaded.

Figure 5:
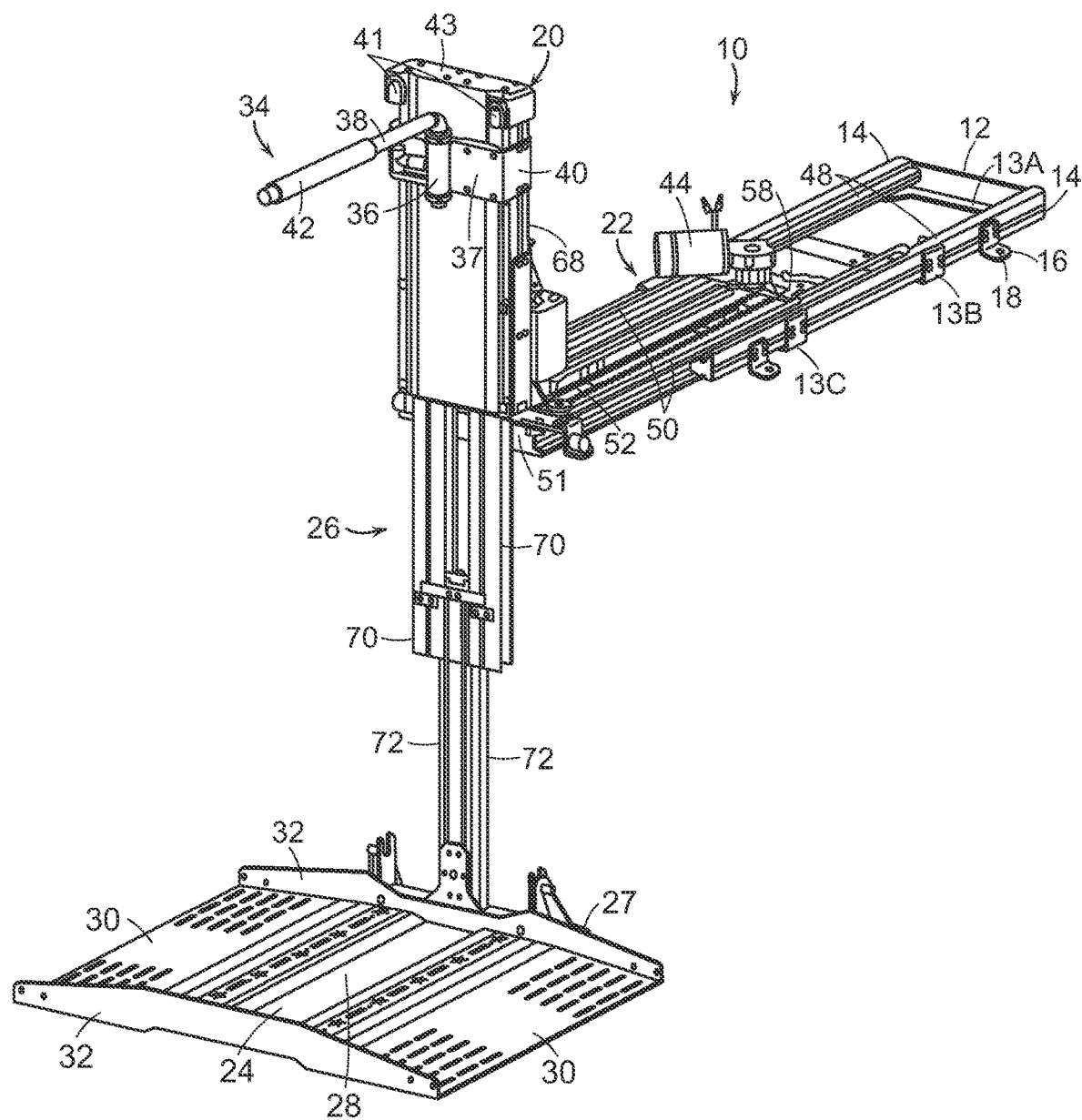
FIG. 5 is a front perspective view of the vehicle lift of FIG. 1 in a fully extended condition.
Figure 6:
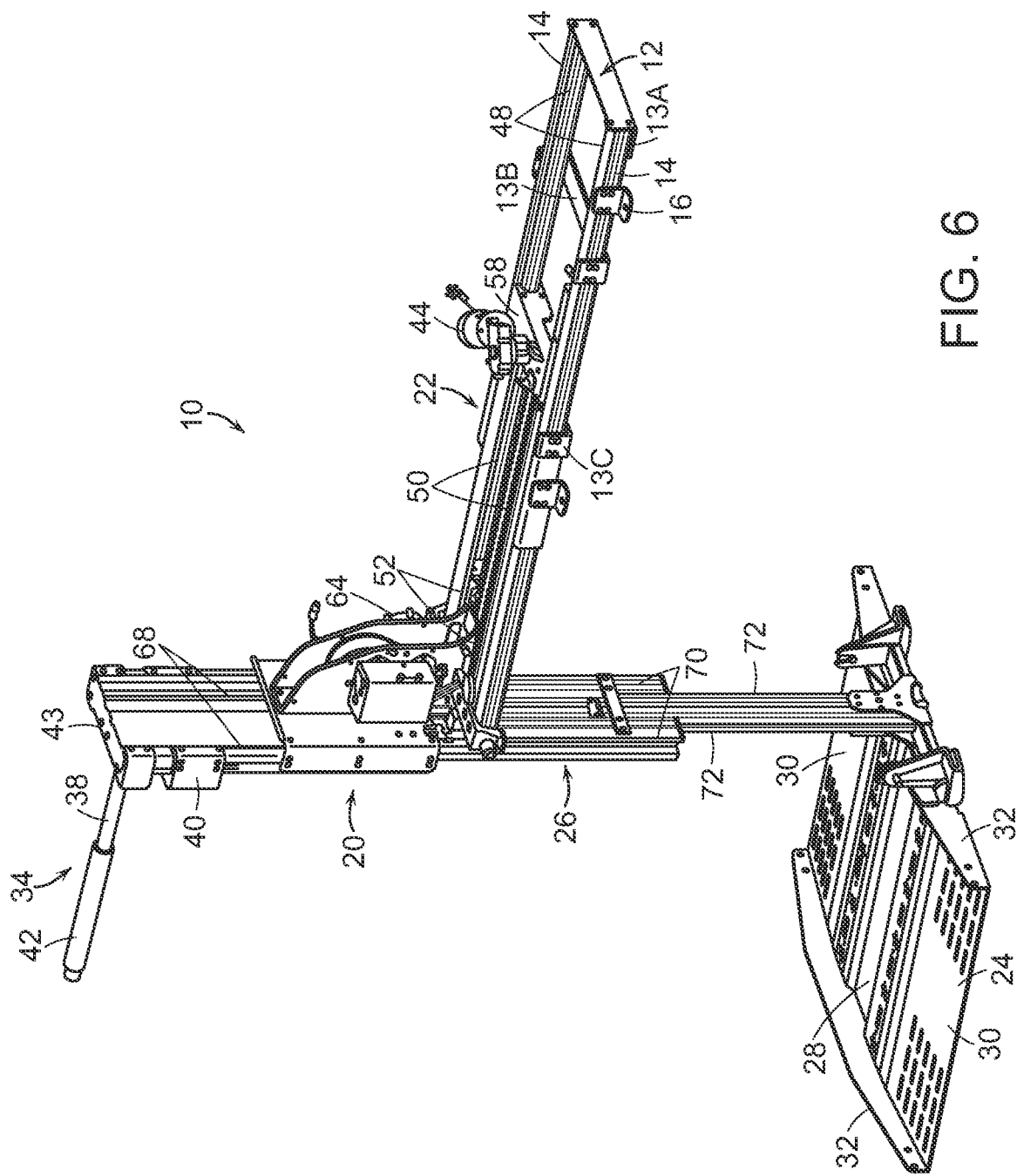
FIG. 6 is a rear perspective view of the vehicle lift of FIG. 1 in a fully extended condition.
Figure 7:
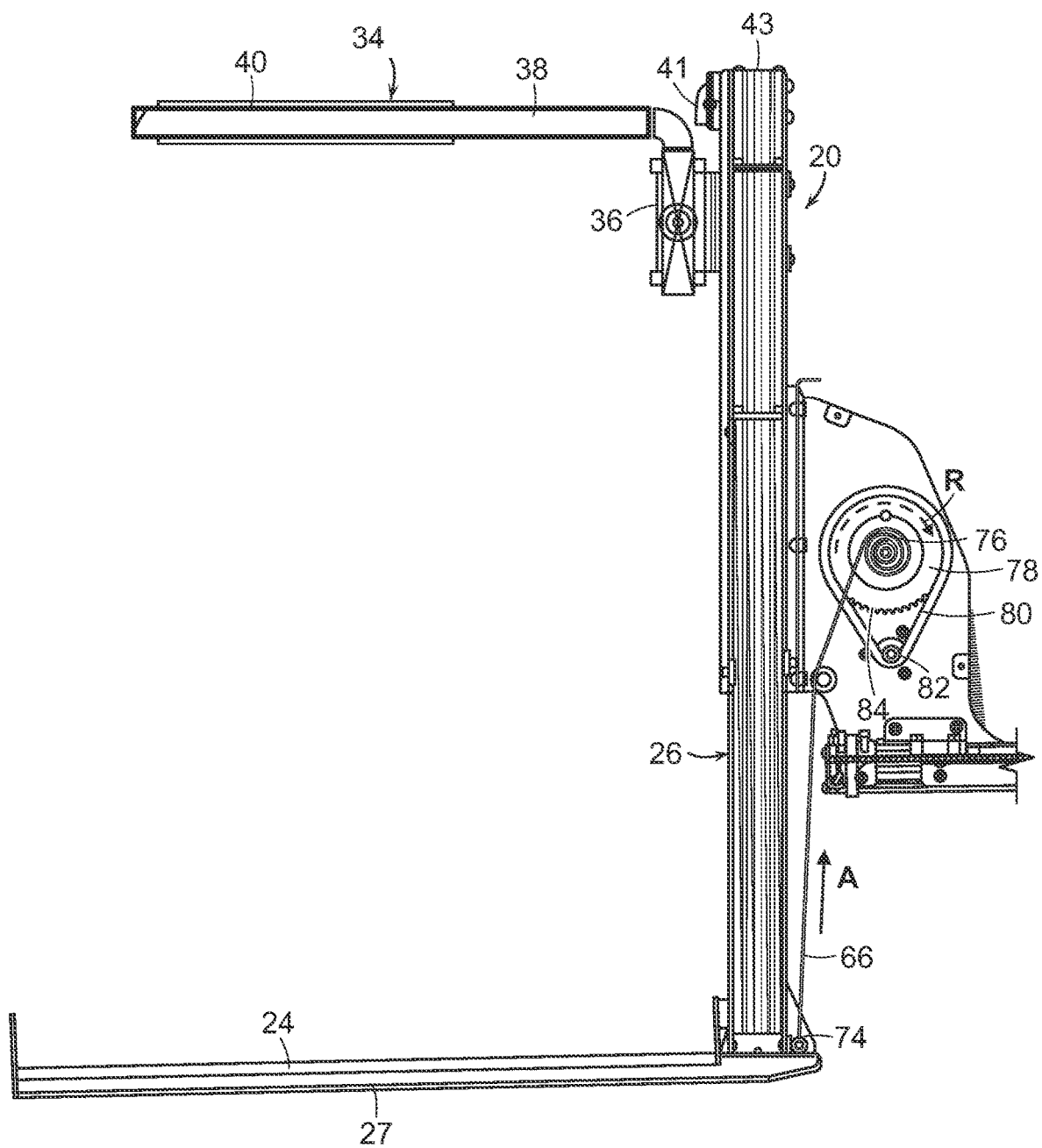
FIG. 7 is an elevation view of a platform and lift tower of the vehicle lift of FIG. 1.
Figure 8:
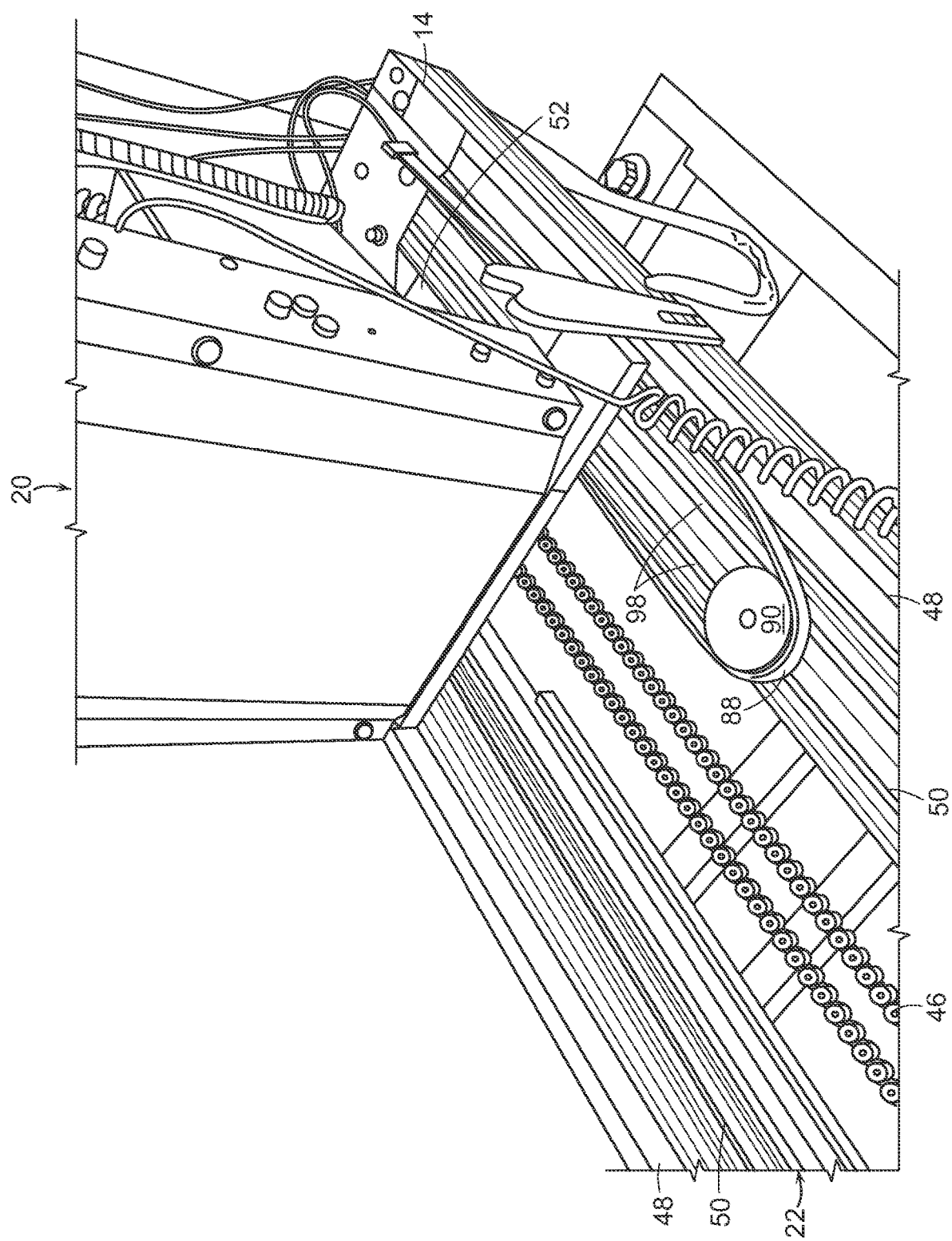
FIG. 8 is a perspective view of a portion of a first rail assembly and a lift tower of the vehicle lift of FIG. 1 in a stored condition.
Figure 9:
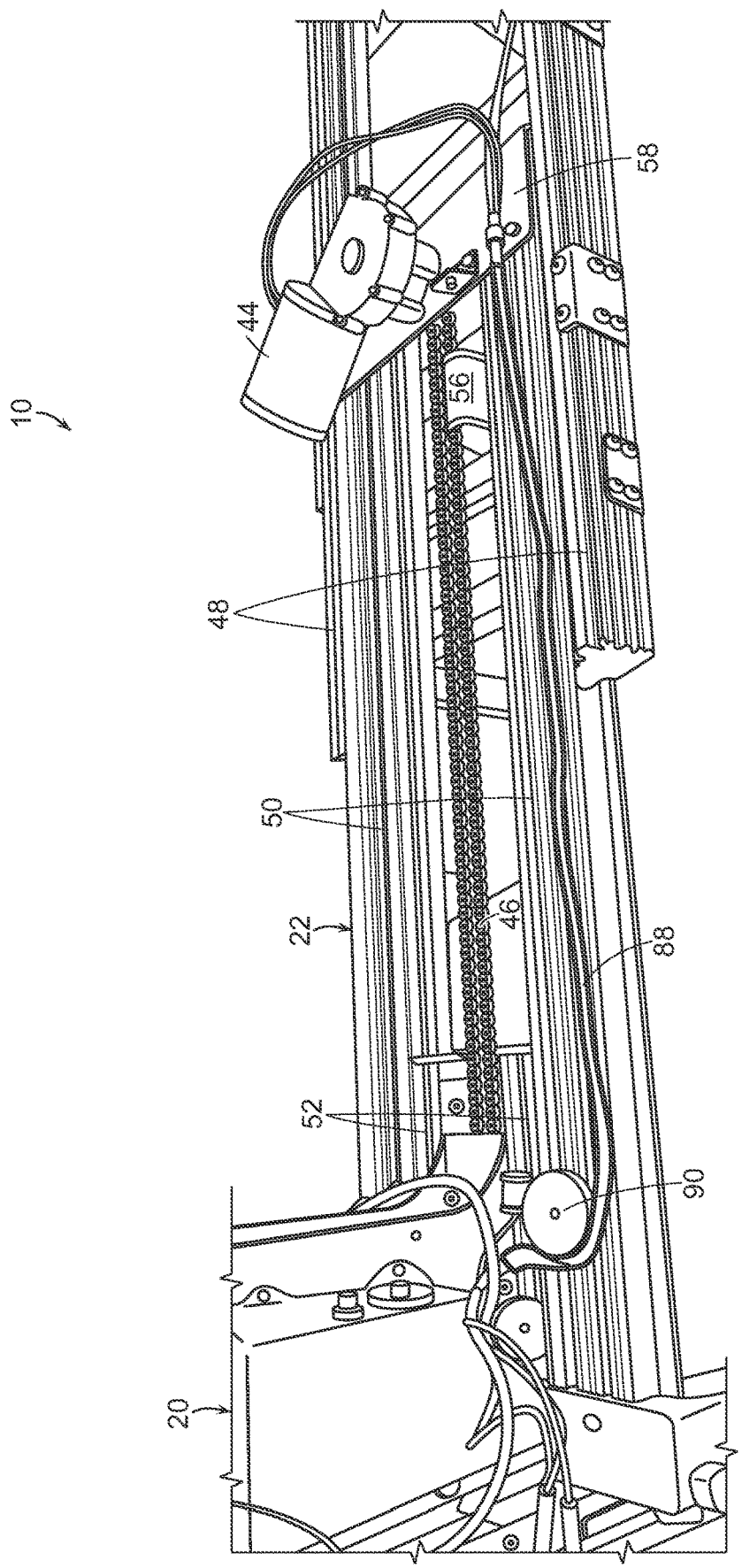
FIG. 9 is a perspective view of a portion of a first rail assembly and a lift tower of the vehicle lift of FIG. 1 in an extended condition.

As illustrated in FIGS. 2, 5-7, second rail assembly 26 serves to move platform 24 vertically with respect to lift tower 20, and may work in a fashion similar to that of first rail assembly 22. FIG. 2 is a front perspective view of vehicle lift 10 showing second rail assembly 26 in its fully contracted position, as seen when lift tower 20 has been moved horizontally out of the cargo area of the vehicle. FIGS. 5 and 6 are front and rear perspective views, respectively, of vehicle lift 10, showing second rail assembly 26 in its fully extended position, with platform 24 lowered to the ground so that the mobility device can be loaded onto platform 24. FIG. 7 is a schematic side elevation view, showing second rail assembly 26 in its fully extended position with platform 24 lowered to the ground.

Second rail assembly 26 may include at least two pairs of extruded rails that cooperate with a second motor 64 that moves a strap 66 to lower and raise platform 24. In the illustrated embodiment, second rail assembly 26 includes three pairs of extruded rails. Second rail assembly 26 may include a second pair of outer extruded rails 68, each of which is secured to lift tower 12. A second pair of central extruded rails 70 is positioned inwardly and adjacent to the second pair of outer extruded rails 68 such that each central extruded rail 70 slides vertically along a corresponding outer extruded rail 68 as platform 24 moves vertically. A second pair of inner extruded rails 72 is positioned inwardly and adjacent to the second central pair of extruded rails 70 such that each inner extruded rail 72 slides vertically along a corresponding central extruded rail 70 as platform 24 moves vertically. Each inner extruded rail 72 may be secured at a distal end thereof to platform 24 such that platform 24 and second pair of inner extruded rails 72 move together vertically.

As seen in FIG. 7, a first end 74 of strap 66 may be secured to platform 24, and an opposed second end 76 of strap 66 may be secured to and wrapped around a portion of a pulley 78. A belt 80 may travel around a second drive gear 82 that is rotated by second motor 64. Belt 80 may engage teeth 84 on pulley 78 causing pulley 78 to rotate and thereby wrap and unwrap strap 66 about pulley 78.

As seen here, second rail assembly 26 is in its fully extended condition, and platform 24 is at its lowermost position, where the mobility device can be loaded onto platform 24. To raise platform 24, second motor 64 is actuated, causing second drive gear 82 to rotate clockwise as seen here, and belt 80 then causes pulley 28 to rotate clockwise as seen here, in the direction of arrow R, thereby winding strap 66 onto pulley 78. As strap 66 is wound onto pulley 78, it pulls platform 24 up in the direction of arrow A until second rail assembly 26 reaches its retracted position. At that point lift tower 12 can be moved horizontally into the cargo area of the vehicle. To lower platform 24, second motor 64 may be actuated to rotate second drive gear 82 counterclockwise, which causes strap 66 to unwind from pulley 78, thereby lowering platform 24.

FIGS. 8-11 illustrate a power cord retention assembly 86 that serves to keep a power cord 88 that supplies power to second motor 64 on lift tower 12 from getting tangled when first rail assembly 22 and lift tower 12 move horizontally. As first rail assembly 22 extends horizontally, power cord 88 may be guided around a take-up spool 90. Take-up spool 90 may be rotatably mounted to a spool carrier 92 that rides along central extruded rail 50. As seen in FIG. 11, spool carrier 92 may include a pair of downwardly extending projections 94. A pair of guide rods 96 may be seated in a pair of apertures 97 formed in projections 94, and may serve to guide spool carrier 92 as it moves along central extruded rail 50. A pair of compression springs 98 may be seated around guided rods 96, and serve to engage spool carrier 92, thereby biasing take-up spool 90 outwardly along first rail assembly 22 so that slack is taken out of power cord 88 as lift tower 12 moves horizontally.

As discussed above, first rail assembly 22 and second rail assembly 26 may be formed of a plurality of extruded rails. The extruded rails may be formed of a lightweight material, such as metal, for example. In certain embodiments the rails may be formed of aluminum, which may provide good strength while being lightweight, and lighter than the typical metals used to form vehicle lifts, such as steel.

The rails of first rail assembly 22 and second rail assembly 26 may take on various profiles. In certain embodiments, first rail assembly 22 and second rail assembly 26 may include rails of a first rail profile 100, as seen in FIG. 12, and a second rail profile 102, as seen in FIG. 13.

In certain embodiments, the inner and outer extruded rails may have first rail profile 100 and the central rails may have second rail profile 102. Thus, first outer extruded rails 48 and first inner extruded rails 52 of first rail assembly 22, and second outer extruded rails 68 and second inner extruded rails 72 of second rail assembly 26 may have first rail profile 100, while first central extruded rails 50 and second central extruded rails 70 may have second rail profile 102. First rail profile 100 and second rail profile 102 are designed and configured such that they may mesh and engage with one another in sliding fashion.

Figure 12:
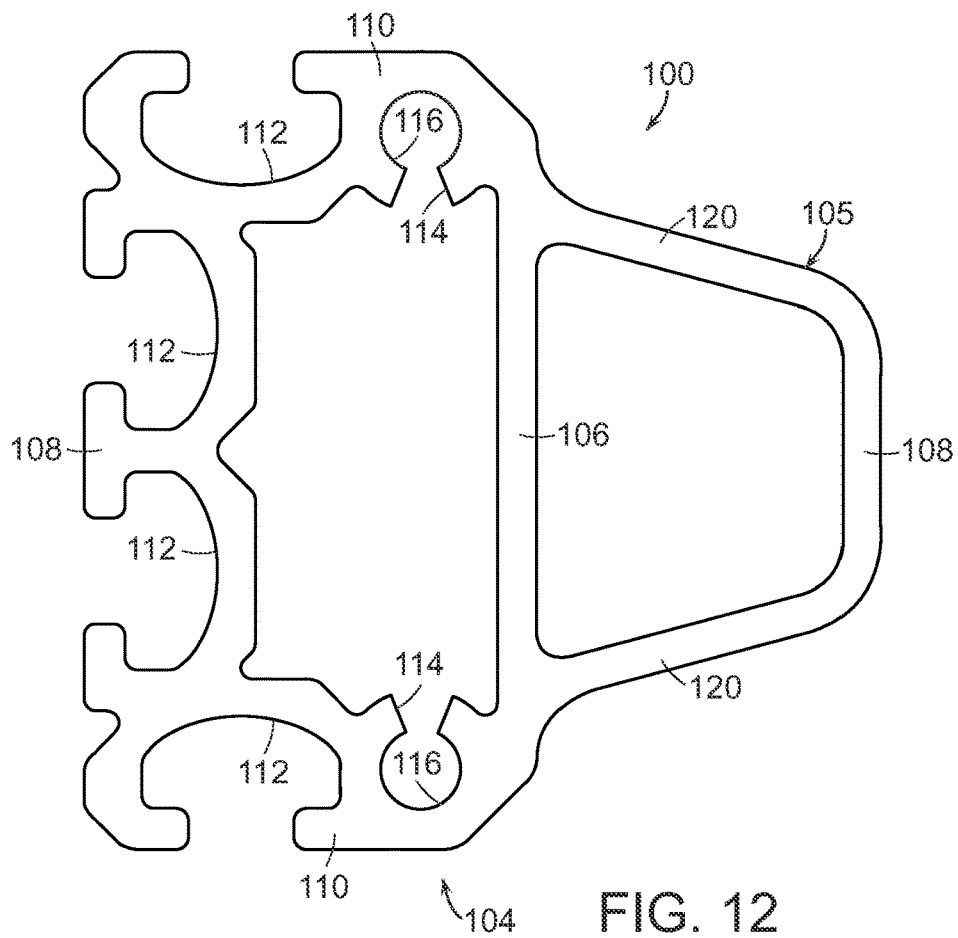
FIG. 12 is an elevation view of a first rail of the vehicle lift of FIG. 1.
Figure 13:
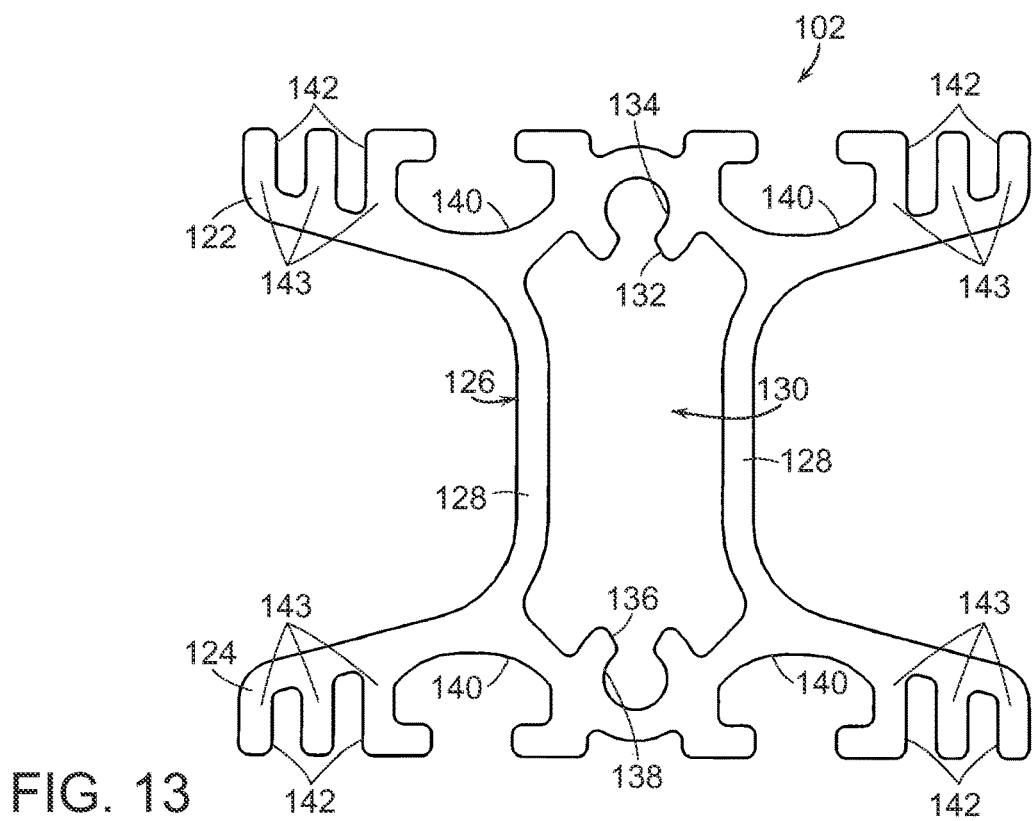
FIG. 13 is an elevation view of a second rail of the vehicle lift of FIG. 1.

As illustrated in FIG. 12, first rail profile 100 may be formed of a first portion 104 and a second portion 105. First portion 104 may have a substantially rectangular box shape including a first side wall 106, an opposed second side wall 108, and a pair of opposed end walls 110. Second side wall 108 and end walls 110 may have a thickness greater than that of first side wall 106.

A pair of T-shaped slots 112 may be formed in second side wall 108, and a T-shaped slot 112 may be formed in each end wall 110. T-shaped slots 112 may receive fasteners and other elements that may be secured to the rails of first rail assembly 22 and second rail assembly 26.

A groove 114 may be formed on an interior surface of each end wall 110, and may be in fluid communication with a circular aperture 116 extending along the rail. Groove 114 and aperture 116 may serve to reduce the thickness and weight of end walls 110, can be tapped with threads to receive fasteners, and help improve manufacturability of the extruded rail.

Second portion 105 may have a substantially trapezoid shape, with first side wall 106 forming the base of the trapezoid shape. A third side wall 118 may be opposed from first side wall 106 with a pair of connecting walls 120 extending between first side wall 106 and third side wall 118. Connecting walls 120 may be tapered inwardly as they extend from first side wall to third side wall 118.

As illustrated in FIG. 13, second rail profile 102 may be substantially I shaped with a first flange portion 122, an opposed second flange portion 124, and a web portion 126 extending between first flange portion 122 and second flange portion 124. As seen here, first flange portion 122 and second flange portion 124 may be tapered such that they are thickest where they meet web portion 126 and thinnest at their outermost ends.

Web portion 126 may include pair of spaced apart web walls 128 extending between first flange portion 122 and second flange portion 124 and defining a central aperture 130 that is generally box shaped and that extends along the length of the rail. A first groove 132 may be formed on an interior surface of first flange portion 122, and may be in fluid communication with a first circular aperture 134 extending along the rail, and may extend between central aperture 130 and first circular aperture 134. A second groove 136 may be formed on an interior surface of second portion 124, and may be in fluid communication with a second circular aperture 138 extending along the rail, and may extend between central aperture 130 and second circular aperture 138. First and second circular apertures 134, 138 may be threaded and used with fasteners.

A pair of T-shaped slots 140 are formed on an exterior surface of first flange portion 122, and a pair of T-shaped slots 140 are formed on an exterior surface of second flange portion 124. T-shaped slots 140 may serve to received fasteners, or other elements, such as projections 94 on spool carrier 92, as seen in FIG. 11 above.

A plurality of vertically extending grooves 142 may be formed on the exterior surface of first flange portion 122 and second flange portion 124, defining vertically extending fingers 143. In the illustrated embodiment, a pair of grooves 142 is formed proximate each end of first flange portion 122, and a pair of grooves 142 is formed proximate each end of second flange portion 124. Grooves 142 in combination with fingers 143 serve to reduce the volume and weight of first and second flange portions 122, 124 while at the same time increasing their strength.

The use of extruded rails with profiles as seen in FIGS. 12 and 13 may help to provide substantial moments of inertial for the rails, while allowing for reduced heights for first rail assembly 22 and second rail assembly 26. The light weight and strength of such rails allows vehicle lift 10 to meet a static load of 3× the rated load, which is a requirement in Texas, for example.

Figure 14:
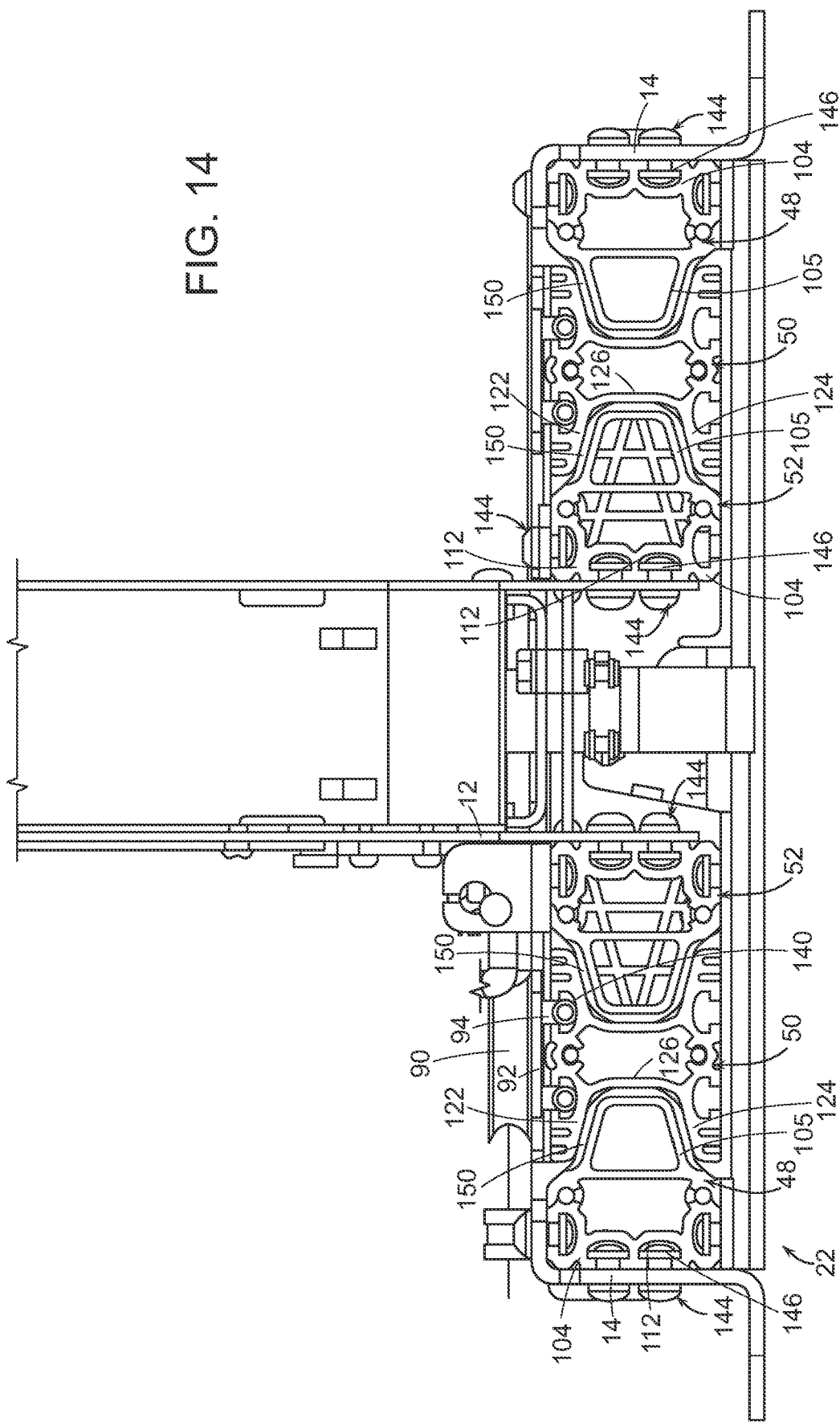
FIG. 14 is a section view of a lift tower and a first rail assembly of the vehicle lift of FIG. 1.

A cross-section of first rail assembly 22 is seen in greater detail in FIG. 14. As noted above, outer extruded rails 48 and inner extruded rails 52 have first rail profile 100, as seen in FIG. 12, while central extruded rails 50 have second rail profile 102, as seen in FIG. 13.

As seen here, outer extruded rails 48 may be secured to side rails 14 with fasteners 144 and nuts 146, which are received in T-shaped slots 112 formed in the first portion 104 of outer extruded rails 48. Central extruded rails may be secured to lift tower 12 by way of fasteners 144 and nuts 146 received in T-shaped slots 112 formed in the first portion 104 of central extruded rails 52.

Figure 16:
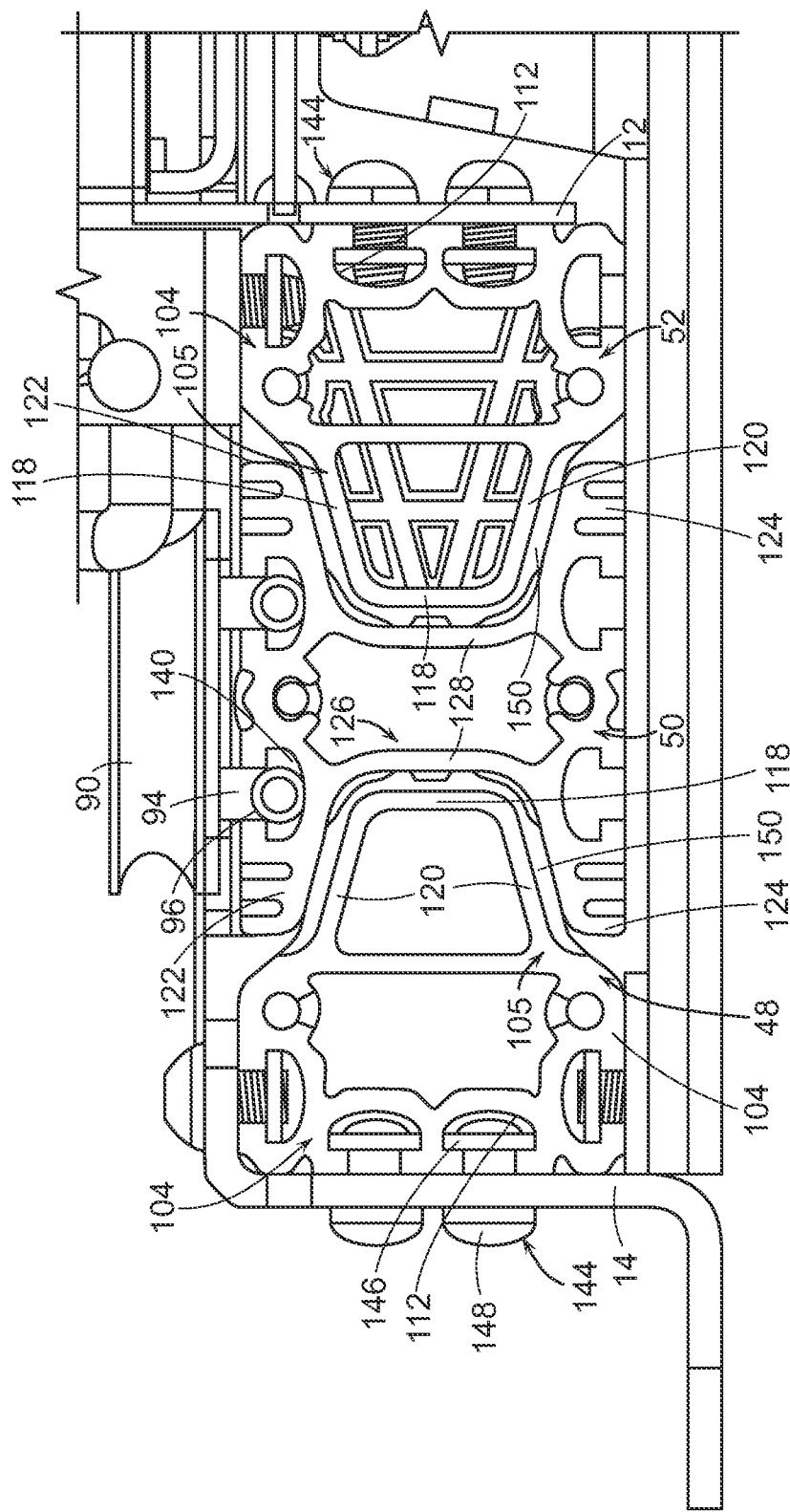
FIG. 16 is a section view of a portion of a first rail assembly of the vehicle lift of FIG. 1.

In certain embodiments, fasteners 144 may include a threaded plate or nut 146, which is seated within T-shaped slot 112 and receives a threaded screw 148, as seen in FIG. 16 below. Other suitable types of fasteners 144 will become readily apparent to those skilled in the art, given the benefit of this disclosure.

The nesting engagement of first pair of outer extruded rails 48 with first pair of central extruded rails 50, and the engagement of first pair of inner extruded rails 52 with first pair of central extruded rails 50 can be seen here. The first portion 105 of each of the outer extruded rails 48 is nested within the first flange portion 122, second flange portion 124 and web portion 126 of an adjacent central extruded rail 50. Similarly, the first portion 105 of each of the central extruded rails 52 is nested within the first flange portion 122, second flange portion 124 and web portion 126 of an adjacent central extruded rail 50. Thus, for each engaged rail there are three surfaces that contact an adjacent rail, thereby providing a large surface area across which to distribute weight carried by vehicle lift 10.

The tapered aspect of first portion 105 of the first rail profiles 100 and the corresponding tapered aspect of the first flange portions 122 and second flange portions 124 help aid in the nesting of the two profile types as well centering them with respect to one another.

Figure 15:
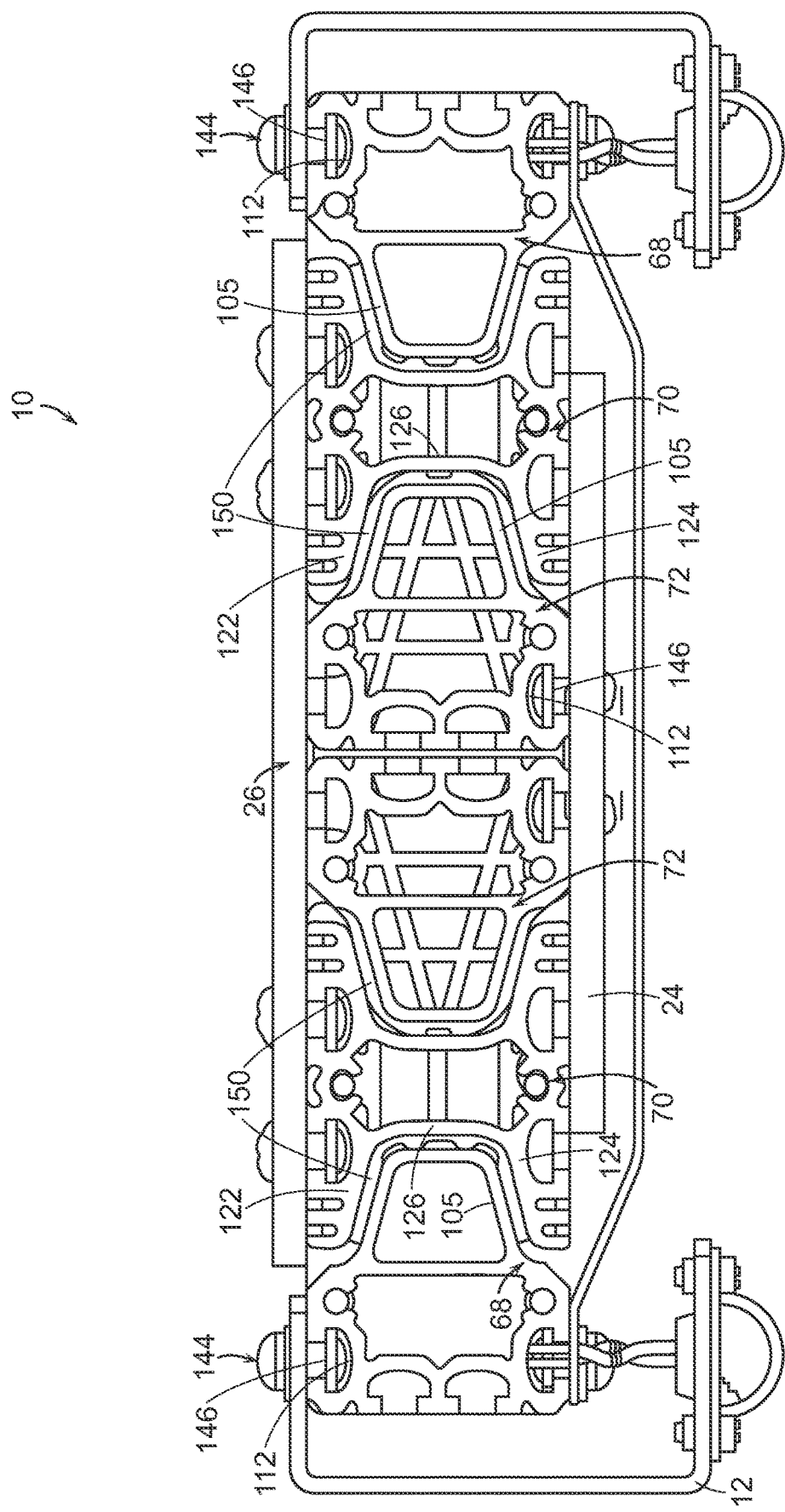
FIG. 15 is a section view of a lift tower and a second rail assembly of the vehicle lift of FIG. 1.

Second rail assembly 26 is seen in greater detail in FIG. 15. As noted above, outer extruded rails 68 and inner extruded rails 72 have first rail profile 100, as seen in FIG. 12, while central extruded rails 70 have second rail profile 102, as seen in FIG. 13.

As seen here, outer extruded rails 68 may be secured to lift tower 12 with fasteners 144 and nuts 146, which are received in T-shaped slots 112 formed in the first portion 104 of outer extruded rails 68. Central extruded rails 72 may be secured to platform 24 by way of fasteners 144 and nuts 146 received in T-shaped slots 112 formed in the first portion 104 of central extruded rails 72.

The nesting engagement of second pair of outer extruded rails 68 with second pair of central extruded rails 70, and the engagement of second pair of inner extruded rails 72 with second pair of central extruded rails 70 can be seen here. The first portion 105 of each of the outer extruded rails 68 is nested within the first flange portion 122, second flange portion 124 and web portion 126 of an adjacent central extruded rail 70. Similarly, the first portion 105 of each of the central extruded rails 72 is nested within the first flange portion 122, second flange portion 124 and web portion 126 of an adjacent central extruded rail 70. Thus, for each engaged rail there are three surfaces that contact an adjacent rail, thereby providing a large surface area across which to distribute weight carried by vehicle lift 10.

The tapered aspect of first portion 105 of the first rail profiles 100 and the corresponding tapered aspect of the first flange portions 122 and second flange portions 124 help aid in the nesting of the two profile types as well centering them with respect to one another.

In certain embodiments, as illustrated in FIGS. 14-16, bearings 150 may be positioned between adjacent rails of first rail assembly 22 and second rail assembly 126. In first rail assembly 22, a bearing 150 may be positioned between outer extruded rails 48 and central extruded rails 50 as well as between inner extruded rails 52 and central extruded rails 50. As seen most clearly in FIG. 16, such a bearing 150 may wrap around each of the trapezoid shaped second portions 105 of outer extruded rail 48 and inner extruded rail 52. Thus, bearing 150 may extend between connecting walls 120 of second portions 105 and each of first flange portion 122 and second flange portion 124, as well as between each third side wall 118 and web walls 128 of web portion 126.

It is to be appreciated that bearings 150 can extend along the rails of first rail assembly 22 and second assembly 26 for any desired distance. Thus, any one or more of bearings 150 can extend along a complete length of any of the rails of first rail assembly 22 and second assembly 26, and any one or more of bearings 150 can extend along less than a complete length of any of the rails of first rail assembly 22 and second assembly 26. In certain embodiments, bearings 150 are positioned inwardly of ends of the respective rails of first rail assembly 22 and second assembly 26.

In certain embodiments, bearings 150 may be formed of a thermoplastic, such as acetal, nylon, or polycarbonate. Other suitable materials for bearings 150 will become readily apparent to those skilled in the art, given the benefit of this disclosure. In certain embodiments, bearings 150 may include synthetic polymer fibers, such as aramid for example, which may help provide strength and thermal stability to bearings 150. Bearings 150 may also include lubricants, such as silicone or polytetrafluoroethylene (e.g. Teflon®), for example.

Figure 17:
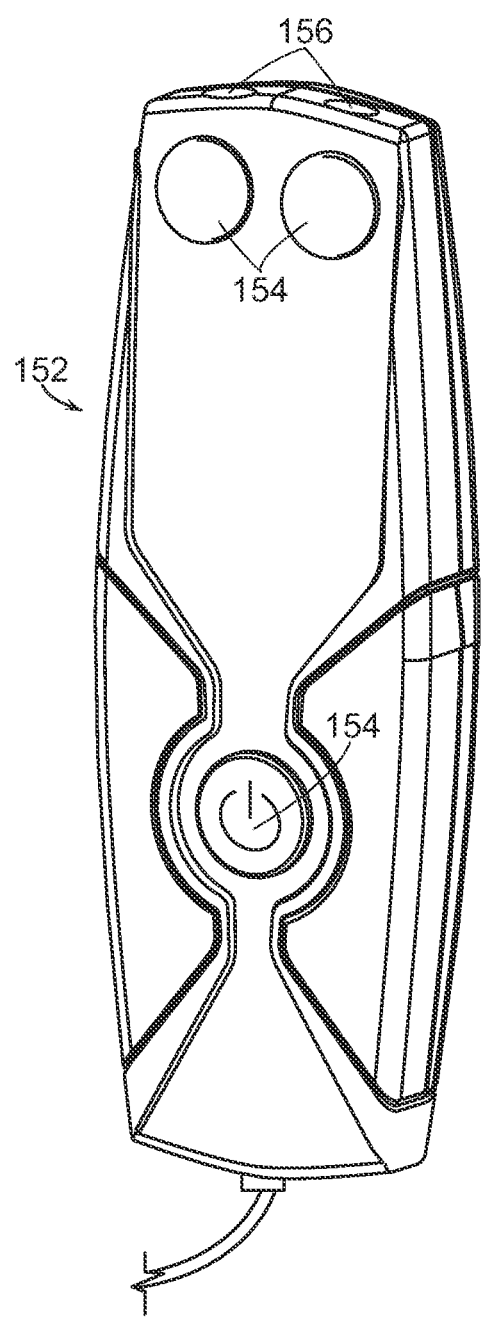
FIG. 17 is a perspective view of a handheld control for the vehicle lift of FIG. 1.

A handheld control 152 used for control of vehicle lift 10 is illustrated in FIG. 17. Handheld control 152 may have a plurality of buttons 154 that can be depressed by the user to control the power and movements of vehicle lift 10, such as retraction and extension of lift tower 20 along first rail assembly, and up and down movement of platform 24 along second rail assembly 24. Buttons 154 may be backlit so they are easily visible to the user when it is dark. Handheld control 152 is illustrated as a hard-wired device. It is to be appreciated that in certain embodiments handheld control 152 could be a wireless device.

One or more lights 156 may be positioned at a distal end of handheld control 152, and project outwardly to act as a flashlight to help illuminate the cargo area of the vehicle and vehicle lift 10. Thus, lights 156 could be used to illuminate an area around vehicle left 10 or below platform 24, for example, to ensure that nothing is obstructing operation of vehicle lift 10.

In the illustrated embodiment two lights 156 are positioned on handheld control 152. It is to be appreciated that any number of lights may be positioned on handheld control 152. In certain embodiments, lights 156 may be LED lights. Other suitable light types for lights 156 will become readily apparent to those skilled in the art, given the benefit of this disclosure.

Various embodiments of a vehicle lift for a mobility device have been described herein, which include various components and features. In other embodiments, the vehicle lift may be provided with any combination of such components and features. It is also understood that in other embodiments, the various devices, components, and features of the vehicle lift described herein may be constructed with similar structural and functional elements having different configurations, including different ornamental appearances.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims.

What is claimed is:

1. A vehicle lift comprising:
   a lift base configured to be mounted in a cargo area of a vehicle;
   a lift tower movable with respect to the lift base;
   a platform movable with respect to the lift tower;
   a first rail assembly fixed to the lift base and the lift tower and configured to move the lift tower horizontally with respect to the lift base, the first rail assembly comprising
      a first pair of outer extruded rails secured to the lift base;
      a first pair of central extruded rails movable with respect to the first pair of outer extruded rails; and
      a first pair of inner extruded rails movable with respect to the first pair of central extruded rails and fixed to the lift tower,
   wherein the first pair of outer extruded rails and the first pair of inner extruded rails comprise
      a first portion having a substantially rectangular box shape including a first side wall, an opposed second side wall, and a pair of opposed end walls; and
      a second portion having a substantially trapezoid shape, wherein the first side wall of the first portion defines a base wall of the second portion,
   wherein the first pair of central extruded rails are substantially I-shaped and include a first flange portion, an opposed second flange portion, and a web portion extending between the first flange portion and the second flange portion,
   wherein the second portion of each outer extruded rail and each inner extruded rail is nested within the first flange portions, the opposed second flange portion, and the web portion of one of the central extruded rails; and
   a plurality of bearings, each bearing comprising a sheet wrapping around one of the second portions, the bearings forming the sole contact between the second portions and the central extruded rails.

2. The vehicle lift of claim 1, further comprising a second rail assembly fixed to the lift tower and the platform and configured to move the platform vertically with respect to the lift tower, the second rail assembly comprising at least two pairs of extruded rails, one pair of extruded rails being secured to the lift tower, and another pair of extruded rails being secured to the platform and movable with respect to the pair of extruded rails secured to the lift tower.

3. The vehicle lift of claim 2, wherein the second rail assembly comprises:
   a second pair of outer extruded rails secured to the lift tower;
   a second pair of central extruded rails movable with respect to the second pair of outer extruded rails; and
   a second pair of inner extruded rails movable with respect to the second pair of central extruded rails and fixed to the lift tower.

4. The vehicle lift of claim 2, further comprising a handheld control operable to control movement of the first rail assembly and the second rail assembly.

5. The vehicle lift of claim 4, wherein the handheld control includes a light.

6. The vehicle lift of claim 5, wherein the light is an LED light.

7. The vehicle lift of claim 1, wherein each end wall includes a substantially T-shaped slot formed therein, and each second side wall includes a pair of substantially T-shaped slot formed therein.

8. The vehicle lift of claim 7 further comprising a plurality of fasteners, each fastener being seated in one of the T-shaped slots in one of the second side walls of the outer extruded rails and securing a corresponding outer extruded rail to the lift base.

9. The vehicle lift of claim 7, further comprising a plurality of fasteners, each fastener being seated in one of the T-shaped slots in one of the second side walls of the inner extruded rails and securing a corresponding inner extruded rail to the lift tower.

10. The vehicle lift of claim 7, further comprising a plurality of fasteners, each fastener being seated in one of the T-shaped slots in one of the second side walls of the outer extruded rails and securing a corresponding outer extruded rail to the lift tower.

11. The vehicle lift of claim 7, further comprising a plurality of fasteners, each fastener being seated in one of the T-shaped slots in one of the second side walls of the inner extruded rails and securing a corresponding inner extruded rail to the platform.

12. The vehicle lift of claim 1, further comprising a pair of substantially T-shaped slots formed in an exterior surface of each of the first flange portion and the second flange portion.

13. The vehicle lift of claim 1, wherein the web portion comprises a pair of web walls spaced from one another.

14. The vehicle lift of claim 1, wherein each bearing is formed of acetal, aramid fibers, and teflon.

15. The vehicle lift of claim 1, further comprising a hold down arm pivotally secured to the lift tower.

16. The vehicle lift of claim 15, wherein the hold down arm includes a foam sleeve.

17. The vehicle lift of claim 1, further comprising at least one downwardly projecting light on the lift tower.

18. The vehicle lift of claim 17, wherein the at least one downwardly projecting light is an LED light.

19. A vehicle lift comprising:
   a lift base configured to be mounted in a cargo area of a vehicle;
   a lift tower movable with respect to the lift base;
   a platform movable with respect to the lift tower;
   a first rail assembly fixed to the lift base and the lift tower and configured to move the lift tower horizontally with respect to the lift base, the first rail assembly comprising:
      a first outer pair of extruded rails secured to the lift base;
      a first central pair of extruded rails movable with respect to the first outer pair of extruded rails; and a first inner pair of extruded rails movable with respect to the first central pair of extruded rails and fixed to the lift tower;

a second rail assembly fixed to the lift tower and the platform and configured to move the platform vertically with respect to the lift tower, the second rail assembly comprising:

a second outer pair of extruded rails secured to the lift tower;

a second central pair of extruded rails movable with respect to the second outer pair of extruded rails; and an inner pair of extruded rails movable with respect to the second central pair of extruded rails and fixed to the lift tower;

wherein the first and second pairs of outer extruded rails and inner extruded rails comprise a first portion having a substantially rectangular box shape including a first side wall, an opposed second side wall, and a pair of opposed end walls; and a second portion having a substantially trapezoid shape, wherein the first side wall of the first portion defines a base wall of the second portion, wherein the first and second pair of central extruded rails are substantially I-shaped and include a first flange portion, an opposed second flange portion, and a web portion extending between the first flange portion and the second flange portion, wherein the second portion of each outer extruded rail and each inner extruded rail is nested within the first flange portion, the opposed second flange portion, and the web portion of one of the central extruded rails;

a plurality of bearings, each bearing comprising a sheet wrapping around one of the second portions, the bearings forming a sole point of contact between the second portions and the central extruded rails; and a handheld control operable to control operation of the first rail assembly and the second rail assembly, and including a pair of LED lights at a distal end thereof.

20. The vehicle lift of claim 19, further comprising at least one downwardly projecting light on the lift tower.

21. The vehicle lift of claim 20, wherein the at least one downwardly projecting light is an LED light.

\* \* \* \* \*